Patented July 16, 1929.

1,720,926

UNITED STATES PATENT OFFICE.

TAISAN SHIGA, OF TOKYO, JAPAN, ASSIGNOR TO TEI KAWATA, OF TOKYO-SHI, JAPAN.

FIREPROOF COMPOSITION.

No Drawing. Application filed October 17, 1927, Serial No. 226,816, and in Japan March 9, 1927.

This invention relates to a fireproof-composition consisting of ammonium phosphate, ammonium sulphate, magnesium borate and boric acid and has for its object to provide a remarkably efficient clear solution of the said three salts.

Various salts have hitherto been used as ingredients in fireproof-compositions and the remarkable efficiency of the above mentioned three salts among them, viz, ammonium phosphate, ammonium sulphate and magnesium borate is well known. A composition consisting of ammonium phosphate and ammonium sulphate has been proposed heretofore, but any composition consisting of the three salts of ammonium phosphate, ammonium sulphate and magnesium borate has not yet been proposed, because no proper method of preparing a mixed solution of the said three salts was known, as ammonium phosphate will decompose, when mixed with most salts except those of ammonium, and will immediately form a precipitate on addition of magnesium borate.

This invention provides a clear solution consisting of the said three salts, which do not suffer any change. This is done in such a manner that first a mixture of ammonium phosphate solution and ammonium sulphate solution is prepared and then a clear solution of magnesium borate is prepared by adding excess of boric acid to the white turbid solution obtained by adding water to magnesium borate, heating and agitating the same, and then the clear solution of magnesium borate thus prepared is added to the first mentioned mixture of ammonium phosphate solution and ammonium sulphate solution.

The first special feature of this invention is that the composition consisting of the said three salts is obtained from the facts that magnesium borate, usually insoluble in water, is made to dissolve in it by the aid of boric acid added thereto, and that the magnesium borate solution thus obtained mixes with the mixture of ammonium phosphate solution and ammonium sulphate solution due to the presence of excess of boric acid therein to form a clear solution.

The second special feature of this invention is that, the boric acid solution of magnesium borate added to the mixture of ammonium phosphate solution and ammonium sulphate solution acts, to some extent, to protect the latter two salts from being washed out. Ammonium phosphate and ammonium sulphate will gradually be washed out when the wood impregnated with their solution comes in contact with water after being dried. This property of being dissolved out is a serious drawback as an ingredient of a fireproof-composition. Magnesium borate dissolved in water by the addition of an excess of boric acid, after drying does not dissolve in water and consequently will not be washed out from the wood impregnated with that solution. This insolubility or the property of not washing out is the most important feature of this fireproof-composition.

The third special feature of this invention is that, the power of absorbing moisture of the fireproof-composition is reduced by the addition of the boric acid solution of magnesium borate to the mixture of ammonium phosphate solution and ammonium sulphate solution, which has the disadvantage that the wood impregnated with it in the absence of the magnesium borate will take up water from the air and its surface will become damp, whilst the wood impregnated with composition of my invention which contains magnesium borate and boric acid does not take up any moisture.

It is a matter of course that the composition made according to this invention has a superior efficiency, as the same consists of the three ingredients as described above, each of which has remarkable fire-proofing property, and this property will last for a long time, on account of the above mentioned features, ammonium phosphate having the most superior fireproofing property being employed in most adequate manner.

This invention may be carried out into practice in the following manner: The quantity of each ingredient of the composition must of course be altered, according to the nature and use of the material to be treated with the composition. At first, a mixture of 2,000-3,000 parts of ammonium phosphate dissolved in five times its weight of water and 1,340 parts of ammonium sulphate dissolved in three times its weight of water is prepared and then a clear solution of magnesium borate is prepared by gradually adding 70 parts of boric acid to a mixture of 100 parts of magnesium borate in 500 parts of water, heating and agitating the same, and then the mixture of the two salts prepared at first is added to the clear solution of magnesium borate prepared afterward.

To apply the composition for practical purposes, the material or the fabric is to be coated with or soaked in the same, or the composition may be poured into an impregnating can which contains the materials or the fabrics and is evacuated of air, if necessary, pressure being applied at the same time.

Having now particularly described and ascertained the nature of the said invention and in what manner the same is to be performed, I declare that what I claim is:—

1. A fireproof-composition prepared by mixing a solution of ammonium phosphate and ammonium sulphate in water, with a clear solution of magnesium borate in boric acid solution, substantially as set forth.

2. A fireproofing composition comprising a clear aqueous solution containing ammonium phosphate, ammonium sulphate, magnesium borate and boric acid.

In testimony whereof I have signed my name to this specification.

TAISAN SHIGA.